United States Patent [19]

Ritzmann

[11] 4,043,746

[45] Aug. 23, 1977

[54] METHOD FOR THE HEAT TREATMENT OF FINE-GRAINED MATERIALS CONTAINING ALKALI COMPOUNDS

[75] Inventor: Horst Ritzmann, Enniger, Germany

[73] Assignee: Polysius AG, Germany

[21] Appl. No.: 679,806

[22] Filed: Apr. 23, 1976

Related U.S. Application Data

[63] Continuation-in-part of Ser. No. 507,388, Sept. 19, 1974, abandoned.

[51] Int. Cl.² ............................................. F27B 7/20
[52] U.S. Cl. .................................. 432/14; 432/106; 106/100; 34/137
[58] Field of Search ............... 106/100; 432/14, 58, 432/106, 109, 105; 34/135, 137

[56] References Cited

U.S. PATENT DOCUMENTS

| | | | |
|---|---|---|---|
| 1,071,303 | 8/1913 | Dreisbach et al. | 432/109 |
| 1,350,750 | 8/1920 | Truesdall et al. | 432/109 |
| 2,590,090 | 3/1952 | DeVaney | 432/106 |
| 2,743,918 | 5/1956 | Struckmann | 432/109 |
| 2,754,197 | 7/1956 | Wienert | 432/105 |
| 3,188,751 | 6/1965 | Sutton | 34/136 |
| 3,584,850 | 6/1971 | Brandrold | 106/100 |
| 3,595,543 | 7/1971 | Tresouthick | 432/105 |
| 3,888,621 | 6/1975 | Williams | 432/45 |
| 3,966,560 | 6/1976 | Farago et al. | 432/26 |

*Primary Examiner*—John J. Camby
*Assistant Examiner*—Henry C. Yuen
*Attorney, Agent, or Firm*—Learman & McCulloch

[57] ABSTRACT

A method for the heat treatment of fine-grained materials containing alkali compounds which liquify at critical temperatures comprises pre-heating the materials and discharging them to a rotary kiln in counterflow to the kiln exhaust gases, and introducing cooling air to the kiln in such quantity and at such temperature as to reduce the temperature of the exhaust gases to a level lower than that required for the compounds to liquify.

8 Claims, 1 Drawing Figure

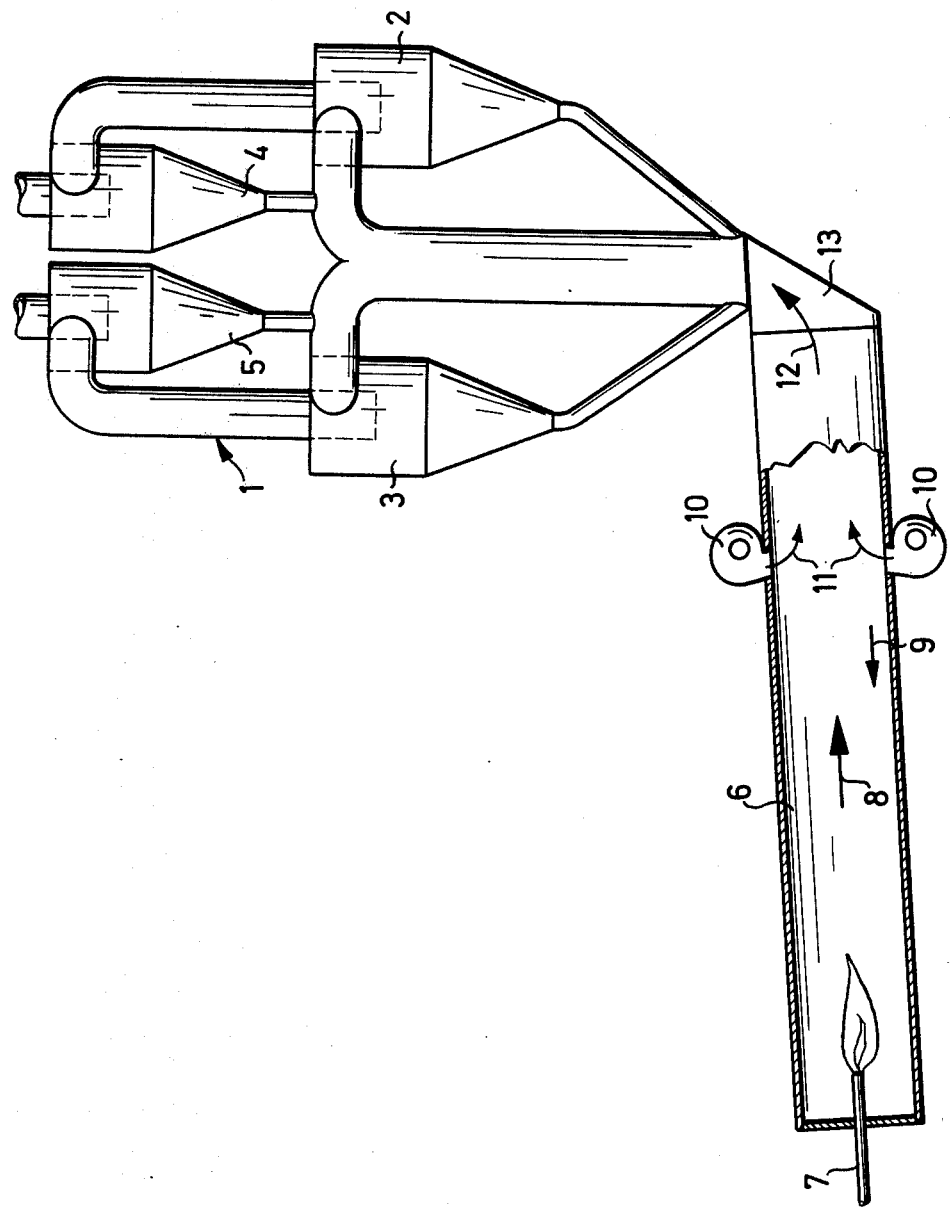

METHOD FOR THE HEAT TREATMENT OF FINE-GRAINED MATERIALS CONTAINING ALKALI COMPOUNDS

RELATED APPLICATION

This application is a continuation-in-part of application Ser. No. 507,388, filed Sept. 19, 1974 now abandoned.

This invention relates to a method for the two-stage heat-treatment of fine-grained material, such as ground raw cement meal, containing compounds of alkalis, chlorine, sulphur, and the like which in the fluid state tend to form deposits, and wherein the pre-heating of the material is carried out in a first heat-treatment stage with the exhaust gases from the second heat-treatment stage, which comprises a rotary kiln with hot gases flowing through in counterflow to the material.

In the firing of raw cement meal, especially in the sintering zone, certain compounds of alkalis, chlorine, and sulphur which leave the exhaust gases from the kiln become volatile and therefore tend to deposit and hence form accretions on the somewhat cooler walls of the pre-heater, on the transition (usually a chute) between the pre-heater and the rotary kiln, and on the cooler raw powder which is to be heated. The removal of these deposits, which is necessary to maintain efficient operation, involves considerable labor costs and often requires somewhat prolonged stoppage of the entire plant.

More detailed investigations have shown that the tendency of these compounds of alkalis, chlorine and sulphur to form deposits is particularly marked when these materials are in the liquid or viscous states. The melting point of the compounds lies generally in the temperature range from about 750° to 1250° C, as is explained in detail in *Cyclic Phenomena in Rotary Kiln Systems* published by applicant in a special edition of *Zement-Kalk-Gips*, No. 8, 1971, pp. 338–343. On the other hand, however, the temperature of the rotary kiln exhaust gases entering the pre-heater also lies in general within this temperature range.

These considerations show that to prevent or greatly reduce the formation of deposits in the pre-heater and in the transition from the pre-heater to the rotary kiln, endeavors must be made to keep the kiln exhaust gas temperature below the liquification temperature of the compounds with a tendency to form deposits. This aim could be achieved by the use of a sufficiently long rotary kiln. The drop in the temperature of the rotary kiln exhaust gases thus obtained, however, involves a high capital cost. In addition it is frequently difficult even for a specific raw material and with the various possible operating conditions to determine exactly the length of kiln needed for a desired exhaust gas temperature. However, the fundamental disadvantage of this approach is that when a different raw material is being used and the operating conditions have changed, the kiln exhaust gas temperature is either too far below or too far above the critical temperature for forming deposits.

This invention therefore has for its object avoiding the foregoing disadvantages by the provision of a method whereby firstly the formation of deposits in the pre-heater and in the transition between the pre-heater and the rotary kiln can be prevented or greatly reduced, and secondly the plant used to carry out the method can be adapted to differing raw materials and firing conditions while maintaining optimum heat consumption and with the minimum possible capital costs.

According to the invention this object is achieved in that, depending on the nature and amount of the deposit-forming compounds and on the other firing conditions, sufficient extra or cooling air is fed into the part of the rotary kiln adjacent the pre-heater to ensure that the temperature of the exhaust gases at the end of the kiln lies below the critical temperature for forming deposits.

If the introduction of this extra air into the rotary kiln reduces the kiln exhaust gas temperature sufficiently for the compounds of alkalis, chlorine and sulphur in the exhaust gases which tend to form deposits to be generally no longer in the liquid but in the solid state, the unwanted deposits in the pre-heater and in the transition between the pre-heater and the rotary kiln are prevented or reduced. The introduction of this extra air does of course cause a somewhat higher heat consumption, but this minor disadvantage is far outweighed by the absence of the maintenance work otherwise needed to remove the deposits.

A particular benefit of the invention is that the rotary kiln can be kept relatively short, since the required reduction in the exhaust gas temperature is achieved by introducing the extra air. The shortening of the rotary kiln length gives an appreciable saving in capital costs.

Since the amount of extra air fed into the rotary kiln can be very precisely metered, the temperature of the kiln exhaust gases can be kept closely below the critical temperature for the formation of deposits even with different raw materials. The more alkali chlorides for instance contained in the raw cement meal, the lower is the melting point and the greater the extra air that must therefore be introduced. Conversely the amount of extra air can be reduced if the raw material contains more alkali sulphides.

If in this way the amount of extra air introduced is matched to the nature and amount of the deposit-forming compounds and to the other firing conditions, optimum heat consumption can be achieved even with changing conditions.

According to the invention the extra air is fed into the rotary kiln at a distance from the material inlet end thereof such that an approximately homogeneous mixture of hot gases and added air is present at the end of the kiln. The extra air may for example be fed into the kiln at a distance from its end which is some two or three times the diameter of the kiln.

In some circumstances it may also be beneficial for the distance of the extra air feed-in point from the kiln end to be made variable.

From the construction aspect the introduction of the extra air may be effected by fans or blowers disposed on the outer periphery of the rotary kiln and rotating with the kiln, the fans being adjustable longitudinally of the kiln in a known manner.

One embodiment of the invention is disclosed in the drawing which is a diagrammatic elevational view of apparatus for practicing the method.

The plant for firing raw cement meal comprises a pre-heater or first heat-treatment stage 1 to which the material is introduced, preheated, and subsequently discharged to a rotary kiln 6. The pre-heater may consist, for example, of two cyclones 2, 3 and 4, 5.

The second heat-treatment stage is formed by the rotary kiln 6, through which hot sintering gases (arrow 8) produced by a burner 7 pass in counterflow to the material (arrow 9). The sintering temperature of cement meal is of course known.

In the rear part of the rotary kiln 6 adjacent the preheater 1 additional air (arrow 11) is forcibly blown in by a number of variable speed fans 10 disposed on the outer periphery of the kiln and rotating with the kiln; this air is of such temperature and in such quantity as to reduce the temperature of the exhaust gases (arrow 12) at the rear end of the kiln so that no undesirable deposits from liquid compounds of alkalis, chlorine, sulphur and the like can occur either in the pre-heater 1 or in the transition 13 between the pre-heater 1 and the rotary kiln 6.

Reference works such as "The Behaviour of Alkalis in Cement Burning", a thesis by Goes, C., submitted at the Bergakademie Clausthal, 1959, list critical temperatures for alkali compounds of the kind referred to herinbefore. For example, the critical temperature of $K_2SO_4$ is 1069° C. and that of $Na_2SO_4$ is 884° C. In the practice of the present process, the exhaust gases leaving the kiln enroute to the preheater should be cooled to less than 1069° C. to prevent the liquification of $K_2SO_4$. To prevent the liquification of $Na_2SO_4$, the exhaust gas should be cooled to a temperature less than 884° C. The quantity of the cooling air admitted via the cooling fans 10 can be adjusted, inasmuch as their speed is variable, to regulate closely the temperature of the exhaust gases so that they will preheat the material in the preheater but will not liquify the alkali compounds. The temperature of the exhaust gas adjacent the material inlet end of the kiln may of course be determined in the usual way by means of known temperature sensing devices.

The following examples illustrate the disclosed process.

EXAMPLE I

Raw cement meal having a sintering temperature of 1450° C. was analysed and found to contain a quantity of $K_2SO_4$, the critical temperature of which is 1069° C. The temperature of the exhaust gas at the material inlet end of the kiln was measured to be 1100° C. and the temperature of the meal discharged from the preheater to the kiln was measured to be 820° C. Liquification of the $K_2SO_4$ was prevented by introducing standard atmosphere air into the kiln via the blowers at a rate (about 0.14 m³ per kg of clinker) sufficient to lower the temperature of the exhaust gas to 1000° C.

EXAMPLE II

Raw cement meal having a sintering temperature of 1400° C. was analysed and found to contain a quantity of $Na_2SO_4$, the critical temperature of which is 884° C. The temperature of the exhaust gas at the material inlet end of the kiln was measured to be 950° C. and the temperature of the meal discharged from the preheater to the kiln was measured to be 800° C. Liquification of the $Na_2SO_4$ was prevented by introducing standard atmosphere air into the kiln via the blowers at a rate (about 0.13 m³ per kg of clinker) sufficient to lower the temperature of the exhaust gas to 870° C.

By analysing the content of any cement meal its constituency can be determined. Then by measuring the temperature of the kiln exhaust gas, as much cooling air may be introduced to the kiln via the variable speed blowers 10 as is required to lower the temperature of the exhaust gas temperature to one only a little below the critical temperature of the deposit-forming material. Typical of the kinds of deposit-forming materials with which the process is applicable are $SiO_2$, $Al_2O_3$, $TiO_2$, $Fe_2O_3$, $Mn_2O_3$, CaO, MgO, $SO_3$, $P_2O_5$, $Na_2O$, $K_2O$, Cl, and mixtures thereof.

What is claimed is:

1. A two-stage method of sintering fine-grained raw cement meal containing a solid compound which at a critical temperature lower than the sintering temperature of said material tends to liquify and form deposits, said solid compound being from the group composed of $SiO_2$, $Al_2O_3$, $TiO_2$, $Fe_2O_3$, $Mn_2O_3$, CaO, MgO, $SO_3$, $P_2O_5$, $Na_2O$, $K_2O$, Cl, and mixtures thereof, said method comprising discharging said material from a preheater to one end of a sintering kiln; directing through said kiln from the other end thereof toward said one end hot gases at a temperature sufficiently high to sinter said material; exhausting the gases from said kiln to said preheater to preheat said material prior to its discharge to said one end of said kiln; and introducing cooling air into said kiln adjacent said one end thereof in sufficient quantity and at such temperature to ensure that the temperature of the gases exhausted from said kiln to said preheater is lower than that of said critical temperature.

2. A two-stage heat treatment method of treating fine-grained raw material having a sintering temperature and containing a solid compound which at a critical temperature lower than said sintering temperature tends to liquify and form deposits, said method comprising directing through a sintering kiln from one end thereof toward the other hot gases at a temperature higher than said critical temperature; preheating said material by exhausting the gases from said kiln to a preheater to which said material is introduced and subsequently delivered to said other end of said kiln; and introducing cooling air into said kiln adjacent said other end thereof in sufficient quantity and at such temperature as to ensure that the temperature of the gases exhausted from said kiln to said preheater is at a temperature lower than said critical temperature.

3. A method according to claim 2 including introducing said air to said kiln at a sufficient distance from said other end thereof that a substantially homogeneous mixture of air and exhaust gases exists at said other end of said kiln.

4. A method according to claim 2 including introducing said air to said kiln at a distance from said other end thereof which is between about two to three times the diameter of said kiln.

5. A method according to claim 2 including forcibly blowing said air into said kiln.

6. A method according to claim 2 including varying the quantity of air introduced to said kiln.

7. A method according to claim 2 wherein said raw material is cement meal.

8. A method according to claim 2 including maintaining the temperature of said gases adjacent said one end of said kiln at least as high as the sintering temperture of said material.

* * * * *